(12) United States Patent
Chiattelli et al.

(10) Patent No.: US 10,323,734 B2
(45) Date of Patent: Jun. 18, 2019

(54) ACTUATOR FOR RENDERING AT LEAST ONE OPTICAL ELEMENT MOVABLE

(71) Applicant: AML Systems, Paris (FR)

(72) Inventors: Claudio Chiattelli, Le Blanc-Mesnil (FR); Cyril Rivier, Courbevoie (FR); Hassan Koulouh, Le Pré-Saint-Gervais (FR)

(73) Assignee: AML SYSTEMS, Paris (FR)

( * ) Notice: Subject to any disclaimer, the term of this patent is extended or adjusted under 35 U.S.C. 154(b) by 164 days.

(21) Appl. No.: 14/807,534

(22) Filed: Jul. 23, 2015

(65) Prior Publication Data
US 2016/0025195 A1 Jan. 28, 2016

(30) Foreign Application Priority Data
Jul. 23, 2014 (FR) ...................................... 14 57094

(51) Int. Cl.
*F16H 19/08* (2006.01)
*B60Q 1/076* (2006.01)
*F16H 57/12* (2006.01)
*F16H 57/021* (2012.01)

(52) U.S. Cl.
CPC ............. *F16H 19/08* (2013.01); *B60Q 1/076* (2013.01); *F16H 57/021* (2013.01); *F16H 57/12* (2013.01); *F16H 2057/0213* (2013.01); *F16H 2057/126* (2013.01)

(58) Field of Classification Search
None
See application file for complete search history.

(56) References Cited

U.S. PATENT DOCUMENTS

| | | | | |
|---|---|---|---|---|
| 4,674,013 A | * | 6/1987 | Manzoni | B60Q 1/076 362/272 |
| 5,605,071 A | * | 2/1997 | Buchanan, Jr. | F16H 1/16 188/134 |

(Continued)

FOREIGN PATENT DOCUMENTS

| | | |
|---|---|---|
| DE | 10 2013 205 806 A1 | 3/2014 |
| EP | 1 431 118 A2 | 6/2004 |
| FR | 2 176 439 A5 | 10/1973 |

(Continued)

OTHER PUBLICATIONS

Preliminary Search Report dated Mar. 11, 2015, in corresponding French Application No. 1457094, filed Jul. 23, 2014, 2 pages.

*Primary Examiner* — Sharon E Payne
(74) *Attorney, Agent, or Firm* — Christensen O'Connor Johnson Kindness PLLC

(57) ABSTRACT

This disclosure relates to an electric actuator to render optical elements movable. The electrical actuator generally has a motor, a mechanical transmission assembly having an endless screw, a support element of the endless screw, a drive mechanism, and a return mechanism. The motor is configured to drive the mechanical transmission assembly and the mechanical transmission assembly is configured to drive the drive mechanism, wherein the return mechanism exerts an axial pressure against the endless screw in such a way as to press the endless screw against the support element. The disclosure also relates to an assembly having a movable optical element and an electric actuator of the movable optical element as described above.

13 Claims, 1 Drawing Sheet

(56) References Cited

U.S. PATENT DOCUMENTS 7,096,891 B2 * 8/2006 Dombray ............. A01G 17/085
  140/119
2013/0229819 A1 9/2013 Koo

FOREIGN PATENT DOCUMENTS

WO      WO 99/28656 A1 * 6/1999 ............. F16H 55/24
WO      2004/061329 A1    7/2004

* cited by examiner

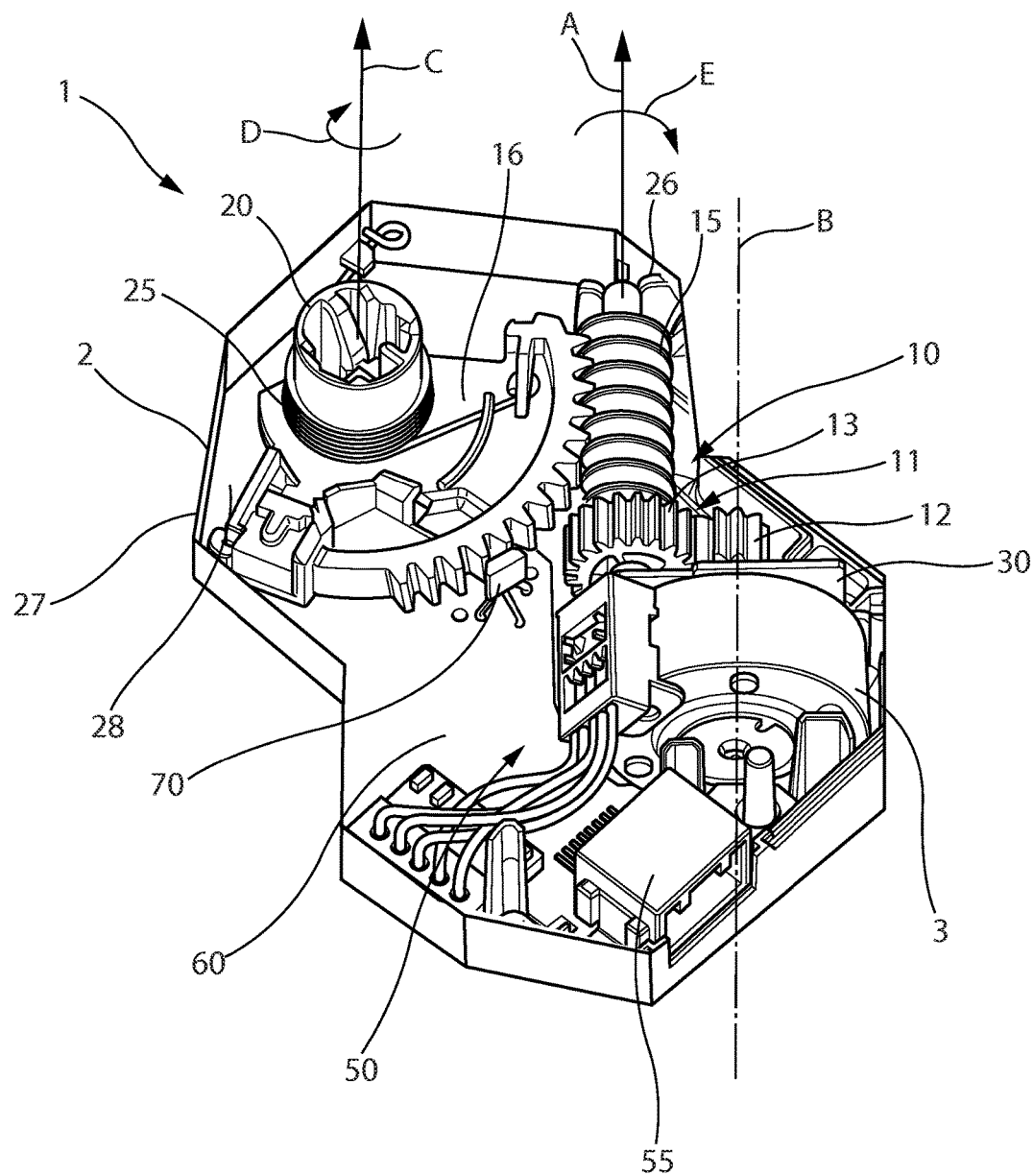

ACTUATOR FOR RENDERING AT LEAST ONE OPTICAL ELEMENT MOVABLE

BACKGROUND

In the field of automotive lighting, it is known to have DBL-type (dynamic bending light) bending headlamps or movable optical elements for the adaptive lighting functions of ADB (adaptive driving beam) lights.

To make the optical elements movable, it is common to use electric actuators comprising a motor and a gear assembly. In order to step down a maximum amount of the output movement from the motor in a minimum amount of space, it is known to provide the gear assembly with an endless screw at the output from the motor combined with spur gears transmitting the movement of the endless screw to the movable optical elements. However, to function efficiently and for reasons of mass-production, the actuators have amounts of toothing play, between the different elements of the gear assembly. These amounts of toothing play have a direct impact on the precision of positioning of the optical elements.

With the widespread use of LED lighting sources and the advent of laser sources, whose particular feature is to have a smaller and more concentrated light source, such amounts of play lead to significant errors in the positioning of the optical elements forming the beam.

With the aim of compensating for as much as possible of the play that the gear assembly comprises, it is known to position a spring in the vicinity of the spur gears of the gear assembly, transmitting the rotary movement to the optical elements. This spring presses the two spur gears against one another and thus compensates for a radial play between these two gears, that is, a play along an axis parallel to the axes of rotation of the two gears. However, this spring does not make it possible to eliminate the radial play of the endless screw, defined by an angle of rotation about the axis of the endless screw, or the axial play of the endless screw, defined by a translation parallel to the axis of rotation of the endless screw. Moreover, each of these two different types of play can independently have an influence on the radial position of the spur gear in contact with the endless screw and thus on the positioning of the movable optical elements.

SUMMARY

The aim of the present disclosure is to improve precision of positioning of the optical elements to prevent significant errors in the forming of the beam.

In accordance with one embodiment of the present disclosure, an electric actuator to render movable at least one optical element is provided. The electric actuator general includes a motor; a mechanical transmission assembly comprising an endless screw; a support element of the endless screw; a drive means intended to drive said movable optical element; a return means, said motor being configured to drive said mechanical transmission assembly and said mechanical transmission assembly being configured to drive said drive means, characterised by the fact that said return means exerts an axial pressure against the endless screw in such a way as to press the endless screw against the support element.

Thus, by virtue of the axial pressure exerted by the return means on the endless screw, the axial play of the endless screw with respect to its support is eliminated, that is, the only axial play of the actuator that influences the positioning of the optical elements is eliminated. Axial play means a play measured parallel to a rotary shaft of the motor and in particular perpendicular to an axis of rotation of the drive means.

This disclosed subject matter thus makes it possible to improve the positioning of the optical elements movable in rotation that play a part in particular in the DBL or ADB type of lighting functions while possessing a mechanical architecture capable of affording sufficient levels of performance in speed, torque and output to fulfil the function.

According to one aspect of the present disclosure, said return means exerts a transverse pressure against said endless screw in such a way as to press the endless screw against the support element. Transverse pressure means a pressure directed in a direction transverse to the axis of rotation of the endless screw. This transverse pressure makes it possible to eliminate the transverse play of the endless screw with respect to its support which therefore cannot influence the positioning of the drive means.

Advantageously, said return means is dimensioned so as to radially block the endless screw for any moment of force less than or equal to 1 millinewton per meter applied to the endless screw. In this way, the return means makes it possible to eliminate a radial play of the endless screw with respect to its support.

Thus, the disclosed subject matter makes it possible, with the aid of a single return means, to eliminate three forms of play of the actuator that have an effect on the positioning of the movable optical elements: the axial play, the transverse play and the radial play of the endless screw with respect to its support.

By virtue of this disclosed subject matter and in particular by virtue of the return means eliminating the forms of play of the endless screw with respect to its support, the vibrations which are exerted on the actuator when the motor vehicle on which it is positioned operates do not lead to any movement of the endless screw liable to change the positioning of the drive means and therefore of the movable optical elements.

According to an embodiment of the present disclosure, the return means is integral with the drive means.

According to an aspect of the present disclosure, the mechanical transmission assembly comprises a first gear between said motor and said endless screw. The endless screw is therefore not positioned directly at the output from the motor. The axial play of the screw can be eliminated more easily, because the screw is not bearing directly on the motor shaft, which would be prejudicial to the proper operation of the latter.

Advantageously, the first gear is configured to step down the movement of the motor transmitted to the endless screw.

According to an aspect of the present disclosure, the mechanical transmission assembly comprises a toothed sector that transmits a movement of the endless screw to the drive means.

According to an embodiment of the present disclosure, said return means presses the toothed sector on the endless screw axially and/or transversely. The play between the toothed sector and the endless screw is consequently eliminated. There is therefore no play between the endless screw and the drive means. It is therefore possible to precisely determine the positioning of the drive means, and consequently of the movable optical element, relative to the positioning of the endless screw.

According to an aspect of the present disclosure, said return means is a torsion spring.

The present disclosure also relates to an assembly comprising a movable optical element and an electric actuator of said movable optical element as defined above.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawing, wherein:

The FIGURE is a perspective view of an electric actuator formed in accordance with one aspect of the present disclosure.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "back," "upward," "downward," "right hand," "left hand," "lateral," "medial," "in," "out," "extended," "advanced," "retracted," "proximal," "distal," "central," etc. These references, and other similar references in the present application, are only to assist in helping describe and understand the particular embodiment and are not intended to limit the present disclosure to these directions or locations. In the following description, the references to longitudinal or lateral are with reference to the optical axis of the reflector and the terms front or rear refer to the direction in which the light beam propagates.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc.

The present disclosure relates to an electric actuator 1 for rendering optical elements movable, as illustrated in the FIGURE. An electric actuator 1 of this kind comprises a housing 2 (of which only a lower half is shown in the FIGURE). The housing 2 comprises a bottom plate 28, and a peripheral wall 27.

The electric actuator 1 also comprises an electric motor 3, a mechanical transmission assembly 10 and a drive means 20. The mechanical transmission assembly 10 is arranged in order to transmit a movement of the electric motor 3 to the drive means 20. The latter is configured to be connected to an optical element (not shown) and to transmit to it a movement of the motor. The motor 3 here drives the mechanical transmission assembly 10 via a shaft of the motor set in rotation about an axis B. Movable optical element means any optical element of a vehicle headlamp, in particular a motor vehicle headlamp, than can be movable, for example with the aim of modifying the shape and/or the direction of the beam of light emitted by the headlamp, including the headlamp itself.

The mechanical transmission assembly 10 comprises a first gear 11 here having two toothed wheels 12, 13, known as first and second toothed wheels 12, 13. The first toothed wheel 12 is in particular situated at the output from the motor 3, that is, it is situated in the extension of the motor shaft. The first gear 11 makes it possible to step down the movement of the electric motor 3, for example by 3. It is understood to mean here that when the electric motor 3 rotates three times, the first toothed wheel 12 rotates three times and the second toothed wheel 13 rotates once.

The mechanical transmission assembly 10 also comprises an endless screw 15. The endless screw 15 is connected in rotation with the first gear 11. The endless screw here rotates about an axis of rotation A combined with the axis of rotation of the second toothed wheel 13. The axis of rotation A is parallel to the axis of rotation B of the first toothed wheel 12.

The endless screw is thus free to rotate about its axis of rotation A. It is fitted to a support. The support here comprises a plate 30 extending in particular against the motor 3 perpendicularly to the motor shaft and a stop 26 projecting relative to the lateral walls 27 of the housing 2. The support forms an integral part in particular of the housing 2.

The mechanical transmission assembly 10 further comprises a toothed sector 16. The toothed sector 16 transmits the movement of the endless screw 15 to the drive means 20. It is fitted rotatably relative to the housing 2 along an axis of rotation C. The axis of rotation of the drive means 20 is combined with that of the toothed sector 16.

In the remainder of the description, radial, transverse and axial play of the endless screw mean the radial, transverse and axial play of the endless screw relative to its support, that is, the play between the endless screw 15 and its support.

According to the present disclosure, the electric actuator 1 comprises a return means 25 exerting an axial pressure on the endless screw 15 in such a way as to press it against its support. Thus, the return means 25 holds the endless screw against the housing 2 and in particular against the plate 30 in such a way as to eliminate the axial play of the endless screw 15. Axial play means the play in an axial direction defined by the motor shaft, that is, the play in a direction parallel to the axis of rotation A. Thus, no axial movement of the endless screw is possible and no axial movement of the endless screw will drive the drive means 20 in rotation.

As the only axial movement of the transmission assembly that can drive the drive means 20 in rotation is that of the endless screw, the present disclosure thus makes it possible to eliminate all the axial plays that influence the angular position of the drive means 20.

The return means 25 also exerts a transverse force on the endless screw 15, that is, a force directed in a direction transverse to that of the axis of rotation of the endless screw, in such a way as to press the endless screw against its support. No transverse movement of the endless screw is possible and no transverse movement of the endless screw will drive the drive means 20 in rotation.

The same return means thus makes it possible to eliminate both the axial play of the endless screw 15 and the transverse play of the endless screw 15.

The return means 25 is in particular situated on the drive means. In particular, and as shown in the FIGURE, the return means 25 presses the toothed sector 16 on the endless screw 15 in an axial and for example transverse direction. The return means 25 here is a torsion spring. It exerts on the toothed sector 16 a radial force about the axis of rotation C, in a clockwise direction relative to the orientation of the axis C, shown by the arrow referenced D. The return means 25 thus presses the teeth of the toothed sector 16 against the endless screw 15 in such a way as to exert on the endless screw 15 the axial and transverse pressures mentioned previously.

Exertion by the return means 25 of an axial pressure against the endless screw 15 limits the rotation of the endless screw in a first radial direction shown here by the arrow E and corresponding to a rotation about the axis of rotation A in a clockwise direction relative to the orientation of the axis of rotation A. This is because, in order to rotate in that direction, the endless screw has to push against the return means in the opposite direction to the axial force.

Furthermore, the axial pressure exerted on the endless screw 15 by the return means 25 creates a stress between the endless screw 15 and its support, in particular between the endless screw 15 and the plate 30 in such a way that the rotation of the endless screw in both directions of rotation is limited. In other words, the endless screw 15 is held axially by the return means 25 against the housing 2, in particular in the area of the plate 30, in such a way that its rotation is likewise blocked by friction between the endless screw 15 and the housing 2.

The return means 25 thus radially blocks the endless screw 15 in both directions of rotation about its axis of rotation. The return means is dimensioned to counter any moment of force applied to the endless screw 15 that is less than or equal to 1 millinewton per meter.

The electric actuator also comprises a motor control system 50 comprising a connector 55 and an electronic board 60.

It further comprises a position sensor 70, configured to detect the angular position of the drive means 20, using here the toothed sector 16. The position sensor 70 is connected to the electronic board 60 in order to transmit to it the position of the drive means 20. The control system 50, by virtue of the information received by the position sensor 70, can then actuate the motor in order to correct any positioning error.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The invention claimed is:

1. An electric actuator to render movable at least one optical element, comprising:
   a motor having a motor rotation axis;
   a mechanical transmission assembly comprising an endless screw having an axis of rotation parallel to the motor rotation axis;
   a support element of the endless screw;
   a drive means having an axis of rotation disposed at a non-zero angle from the axis of rotation of the endless screw, the drive means adapted to drive said movable optical element; and
   a return means,
   said motor being configured to drive said mechanical transmission assembly and said mechanical transmission assembly being configured to drive said drive means, said return means configured to rotationally bias the drive means to exert an axial pressure in a direction biasing the endless screw against the support element so as to eliminate the axial play of the endless screw, wherein the mechanical transmission assembly comprises a first gear between said motor and said endless screw.

2. The electrical actuator of claim 1, wherein said return means is dimensioned so as to radially block the endless screw for any moment of force less than or equal to 1 millinewton per meter applied to the endless screw.

3. The electrical actuator of claim 1, wherein the return means is integral with the drive means.

4. The electrical actuator of claim 1, wherein the first gear is configured to step down the movement of the motor transmitted to the endless screw.

5. The electrical actuator of claim 1, wherein the mechanical transmission assembly comprises a toothed sector that transmits a movement of the endless screw to the drive means.

6. The electrical actuator of claim 1, wherein said return means is a torsion spring.

7. An assembly, comprising a movable optical element and an electric actuator of said movable optical element according to claim 1.

8. The electric actuator of claim 6, wherein the mechanical transmission assembly comprises a toothed sector configured to transmit a movement of the endless screw to the drive means, the toothed sector having an axis of rotation C merging with the axis of rotation of the drive means.

9. The electric actuator of claim 8, wherein the torsion spring comprises a first end exerting on the toothed sector a radial force about the axis of rotation C of the toothed sector, the radial force exerted in a clockwise direction relative to the orientation of the axis of rotation C of the toothed sector.

10. The electric actuator of claim 9, wherein the torsion spring comprises a second end linked to the housing, the second end allowing the toothed sector to exert the axial force on the endless screw.

11. The electric actuator of claim 1, wherein the first gear includes a first toothed wheel and a second tooth wheel, the first toothed wheel having an axis of rotation B merging with the motor rotation axis, the second toothed wheel having an axis of rotation A merging with the axis of rotation of the endless screw, the axis of rotation B being parallel to the axis of rotation A.

12. The electric actuator of claim 1, wherein the support element comprises a plate extending against the motor perpendicularly to the motor shaft and a stop projecting relative to the lateral walls of the housing, the return means being configured to hold the endless screw against the plate in such way as to eliminate the axial play of the endless screw.

13. An electric actuator for rendering movable at least one optical element, comprising:
- a driver having an axis of rotation and adapted to drive said movable optical element;
- a mechanical transmission assembly comprising an endless screw having an axis of rotation disposed at a non-zero angle from the axis of rotation of the driver, said mechanical transmission assembly configured to drive said driver;
- a motor having a motor rotation axis parallel to the axis of rotation of the endless screw and configured to drive said mechanical transmission assembly;
- a support element; and
- a force generator configured to rotationally bias the driver to exert an axial force in a direction biasing the endless screw against the support element so as to eliminate the axial play of the endless screw, wherein the mechanical transmission assembly comprises a first gear between said motor and said endless screw.

* * * * *